June 25, 1963 C. J. HELMS 3,095,507

SERIES MAGNETIC AMPLIFIER

Filed Sept. 25, 1957 6 Sheets-Sheet 1

INVENTOR
CLIFFORD J. HELMS

BY Isidore Match

ATTORNEY

June 25, 1963 C. J. HELMS 3,095,507
SERIES MAGNETIC AMPLIFIER
Filed Sept. 25, 1957 6 Sheets-Sheet 2

INVENTOR
CLIFFORD J. HELMS
BY Isidore Match
ATTORNEY

June 25, 1963 C. J. HELMS 3,095,507

SERIES MAGNETIC AMPLIFIER

Filed Sept. 25, 1957 6 Sheets-Sheet 3

INVENTOR.
CLIFFORD J. HELMS
BY Isidore Match

INVENTOR
CLIFFORD J. HELMS
BY Isidore Match
ATTORNEY

June 25, 1963 C. J. HELMS 3,095,507

SERIES MAGNETIC AMPLIFIER

Filed Sept. 25, 1957 6 Sheets-Sheet 5

INVENTOR
CLIFFORD J. HELMS
BY Isidore Match
ATTORNEY

INVENTOR
CLIFFORD J. HELMS
BY Isidore Match
ATTORNEY

United States Patent Office 3,095,507
Patented June 25, 1963

3,095,507
SERIES MAGNETIC AMPLIFIER

Clifford J. Helms, Norwalk, Conn., assignor to Sperry Rand Corporation, New York, N.Y., a corporation of Delaware Filed Sept. 25, 1957, Ser. No. 686,252
9 Claims. (Cl. 307—88)

This invention relates to magnetic amplifiers and more particularly to improved series magnetic amplifiers adaptable for use in translating information signals in data processing devices.

With the development of digital computers and related types of data processing apparatus, there has arisen the need for translating devices, other than electron discharge tubes, which are small, compact, do not consume much power and are adaptable to various requirements. A very useful product for fulfilling such need is a magnetic core material characterized by a substantially rectangular hysteresis loop. Examples of this product are those materials marketed under the trade names Deltamax and Orthonol.

In the January 1953 issue of "Communication and Electronics," there is described a series magnetic amplifier for computer use by Robert A. Ramey. In this amplifier, a magnetic core in the form of a ring has a primary and a secondary winding. The primary winding has in series therewith a signal source, a diode and a clock voltage (reset clock) the secondary winding having a series therewith a similar clock voltage (power clock) which is in phase with the clock voltage in the primary loop, and a load which may be the succeeding stage in a series chain.

In the operation of this amplifier, the in phase alternating clock voltages alternately drive the core from saturation in one sense to saturation in the opposite sense as long as no voltage is generated by the signal source. In this condition, the core presents a large inductance in series with each clock so that very little current (only the magnetizing current) flows through the load. But if during the reset half cycles, i.e., that half of the cycle when the voltage is tending to switch the core to saturation in the one sense, the signal source develops a voltage sufficient to open the diode in series with it, the core will be left magnetized in the sense to which it had been driven by the power clock during the power half cycle. During the next power half cycle, the core therefore presents a low impedance and nearly the full clock voltage is developed across the load, the current available to the load being limited only by the saturation inductance of the core.

This type circuit presents many serious problems. Close control must be exercised over the core material and the number of turns therearound. The voltages have to be controlled within very close limits (as low as 1%). Without such control, there is experienced a rapid loss of stability and consistancy with consequent degradation of the input signal. Such degradation in a series chain effectively results in the loss or erroneous transmission of input information. Thus, because of slight component or clock voltage variations, a transmitted signal may deteriorate to the point of ambiguity and finally to a logical inversion.

Where a magnetic amplifier is to be used as a logical and an amplifying element in a computer or data processing device, it should fulfill several requirements. For example, its logical input-output characteristics should be as useful as possible in that it should possess both direct and inhibit inputs and that it should posses both direct and inverted outputs. Other general requirements are that it should possess a relatively large power gain; that it should operate at a relatively low power level; and that it should be substantially insensitive to component, voltage, and current variations.

In addition to fulfilling the above set forth general requirements, a series magnetic amplifier when used in computer circuitry preferably should have the following specific characteristics; its secondary output voltage should be larger than its primary input voltage to offset voltage drops through the logical circuitry and it should be capable of both driving and being driven by elements other than magnetic amplifiers such as vacuum tube circuitry, drum heads, etc.

The requirements that the amplifier possess a relatively larger power gain, that it operate at a relatively low power level and that its secondary output voltage be larger than its primary input voltage to offset voltage drops through the logical circuitry are closely interrelated and the considerations involved are the following: The factors determining the power required to flip a magnetic core (change the saturation from one sense to the opposite sense) which in a large measure establishes the power level; the factors determining the power gain of the amplifier; and the question as to how the secondary voltage may be made larger than the primary voltage.

The basic expression for and description of the core power, voltage, current, flux density and magnetizing force are as follows.

For a winding of N turns, $$e=N\frac{d\phi}{dt} \quad (1)$$

for a complete flip of $\phi$ during time T $$eT=N\phi \quad (2)$$

Expressions 2 states that the product of voltage and time equals the product of the turns and the flux change. For any particular core, the complete flux change is fixed by the material type and the geometry or physical dimensions of the core; the number of turns may then be chosen on the basis of the voltage time product. Thus, the secondary voltage may be made larger than the primary voltage for equal intervals of time by simply putting more turns on the secondary than the primary. It is to be observed that this is true not only for equal time intervals but also for unequal time intervals.

For equal time intervals:

$$e_pT=N_p\phi_a \quad (3)$$

$$e_sT=N_s\phi_a \quad (4)$$

$$\frac{e_p}{e_s}=\frac{N_p}{N_s} \quad (5)$$

wherein $e_p$ is the primary voltage, $e_s$ is the secondary voltage $N_p$ is the number of turns on the primary, $N_s$ is the number of turns on the secondary and $a$ is constant.

For unequal time intervals:

$$e_pT_p=N_p\phi_a \quad (6)$$

$$e_sT_s=N_s\phi_a \quad (7)$$

$$\frac{e_pT_p}{e_sT_s}=\frac{N_p}{N_s} \quad (8)$$

The magnetizing force H that is required may be determined by substituting experimentally determined values of I (magnetizing current in the following expression $$H=\frac{0.4\pi NI}{1}$$

The magnetizing current I, may be determined by flipping the saturation sense of a core consisting of a material and having a geometry which are selected in accordance with preliminary design estimates, the voltage across the winding being maintained constant during the flip.

An expression for the power to flip the core may be established as follows $$eT=N\phi \quad (2)$$

$$H=\frac{0.4\pi NI}{1} \quad (9)$$

Since power=P=$eI$, therefore from Expressions 2 and 9 and the expression $\phi=BA$ wherein B is flux density and A is area, then $$P=\frac{BHV}{0.4\pi T} \quad (10)$$

wherein V is the volume of the magnetic material.

It has been found experimentally that H, evaluated by means of Expression 9 increases approximately linearly with inverse flipping time below some fairly well defined value of time.

It is to be noted that the flipping power varies directly with core volume, flux density and magnetizing force and varies approximately inversely with time. However, the dependence of H upon time is to be noted.

The power gain of an amplifier core may be defined as the ratio of power available from the secondary for a specified secondary efficiency, to the power to flip the core. From core geometry considerations, it can be shown that power gain increases as the core size increases due to the reduction in secondary resistance.

It is an object of this invention to provide a magnetic amplifier characterized by input-output stability without requiring close control of voltages, core characteristics, turns, etc.

It is another object to provide a magnetic amplifier characterized by input-output consistency.

In accordance with the invention, there is provided a magnetic amplifier comprising a magnetic core having primary and secondary windings thereon. A clock voltage source is provided in circuit with the secondary winding and means are included for supplying a substantially constant current flowing through the primary winding to cause transformer action in the core whereby the voltage which is reflected to the primary winding is substantially consistently the product of the clock voltage and the primary to secondary winding turns ratio.

Also, in accordance with the invention, there is provided a magnetic amplifier comprising a magnetic core having primary and secondary windings thereon. A clock voltage source is provided which is in circuit with the secondary winding, the clock voltage source producing an asymmetric rectangular wave having positive and negative going portions, one of the portions having the greater width, the other of the portions having the greater amplitude, the area of each of the portions being substantially equal. Means are provided for supplying a substantially constant current in the primary winding to cause transformer action in the core whereby the voltage reflected to the primary winding is substantially consistently the product of the clock voltage and the primary to secondary winding turns ratio.

There is also provided in this invention a circuit for producing first and second trains of like asymmetric rectangular waves. The first and second trains being respectively displaced 180° in phase from each other comprising means for deriving first and second like sine wave trains, the first sine wave train preceding the second sine wave train by about 36°. First and second transformers are included in the circuit. A mixer circuit comprising an "or" circuit arrangement having a bi-directional clamped output is provided and means are included for applying the first and second trains of sine waves to the mixer circuit through the respective first and second transformers.

For a better understanding of the invention, together with other and further objects thereof, reference is had to the following description taken in connection with the accompanying drawings and its scope will be pointed out in the appended claims.

In the drawings, FIG. 1, is a schematic depiction of a preferred embodiment of the invention;

Figure 1:
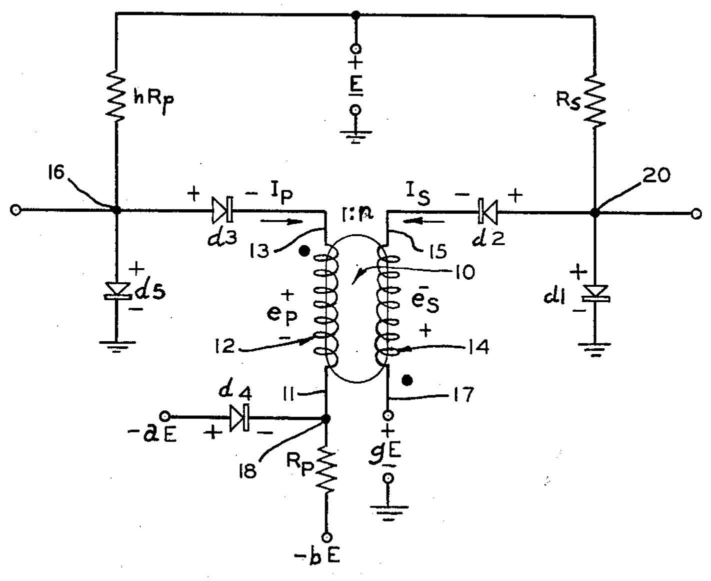

Referring now to FIG. 1, there is shown a preferred embodiment of the present invention. A unitary magnetic core 10, preferably in the form of closed loop or ring and preferably comprising a magnetic material characterized by a relatively rectangular hysteresis loop has a primary winding 12 and a secondary winding 14 thereon. A source of potential E is connected to one end 13 of primary winding 12 through a series arrangement of a resistance $hR_p$ and a diode $d_3$, diode $d_3$ being poled in the forward direction of current flow with respect to potential source E. The junction 16 of resistance $hR_p$ and diode $d_3$ is the input terminal and is grounded through a diode $d_5$, the latter also being poled in the forward direction of current flow. The other end 11 of primary winding 12 is connected to a source of negative potential $b$E through a resistance $R_p$. A source of negative potential, $a$E, is connected to the junction point 18 of the other end 11 of primary winding 12 and resistance $R_p$ through a diode $d_4$, $d_4$ being so poled as to conduct when junction point 18 is negative with respect to negative potential source $a$E.

Potential source E is also connected to an end 15 of secondary winding 14 through a series arrangement of a resistance $R_s$ and a diode $d_2$, $d_2$ being poled in the forward direction of current flow with respect to potential source E. The junction point 20 of resistance $R_s$ and diode $d_2$ is grounded through a diode $d_1$, diode $d_1$ also being poled in the forward direction of current flow with respect to potential source E. The other end 17 of secondary winding 14 is connected to a clock voltage source $g$E, the preferable configuration of signals from source $g$E being further explained hereinbelow. The output is taken from junction point 20. In the circuit, the diodes are preferably of the semi conductor type in the interest of miniaturization and power and space saving considerations.

Prior to describing the operation of the device of FIG. 1, there will be set forth the relationships which are required for desired operation. In the immediately following descriptive material, the voltages are referred to E for comparison. The following definitions obtain:

E is a positive voltage bias (typically 30 to 40 volts)

$g$E is the peak (+ or −) clock voltage ($g$ is typically 0.2 to 0.5)

$b$E is a negative voltage bias ($b$ is typically −1 to−2)

$a$E is a negative voltage bias ($a$ is typically −0.1 to −0.2)

$I_m$ is the primary magnetizing current ($I_m$ is essentially constant during pulse) $n$ is secondary to primary turns ratio ($n$ is typically 2 to 5).

The conditions required are:

$-(b-a)\ E/R_p$ is greater than $I_m$ (ratio typically 1.5 to 2)
$-aE$ is greater than $gE/n$ (ratio typically 1.2 to 1.5)
$ed_1$ is greater than $ed_2$ during core transitions
$E/hR_p$ is about 10% greater than $bE/R_p$ (to insure sufficient primary current and to prevent pull down of input when primary saturates)

In the primary loop the equations which obtain are:

$$-(b-a)\ E/R_p=I_a$$
$$e_p=(gE-v)/n \text{ (primary flip)}$$

wherein $e_p$ is voltage across the primary winding $$I_a \text{ is greater than } I_m$$

In the secondary loop, the equations which obtain are:

$$e_s=gE+(ed_2-ed_1)=gE-v \text{ (secondary flip)}$$

wherein $e_s$ is the voltage across the secondary winding $v=ed_1-ed_2$, $v$ is much less than $gE$.

The transformer conditions which obtain are:

$$e_p=e_s/n$$
$$I_p=I_m+nI_s$$

where $I_p$ is the current in the primary loop and $I_s$ is the current in the secondary loop.

Referring back to FIG. 1, E may have a value of 30 volts, $g$E a value of about 10 volts, $b$E a value of −50 volts and $a$E a value of −6 volts, and $n$ a value of between 2 and 3.

Figure 2:
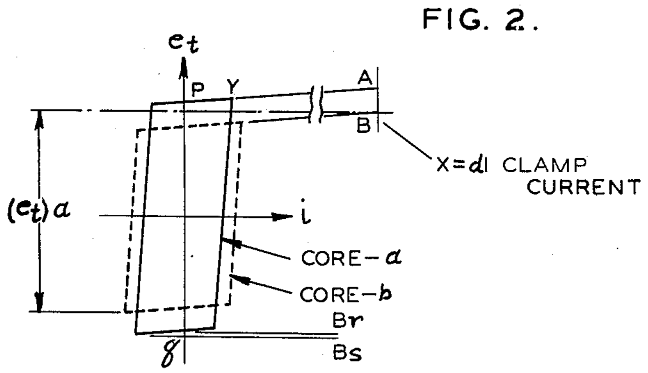
FIG. 2 shows the sequence of events in the hysteresis loop of the magnetic core shown in the circuit of FIG. 1.

In considering the operation of the invention, let it be assumed that at the completion of a secondary transition, the state of the core is near point X in FIG. 2. There is now to be considered the sequence of events in the circuit during primary and secondary transitions with 0 input and the corresponding sequence of events with a −6 volts input ($a$E has been chosen to be −6 volts).

Figure 3:
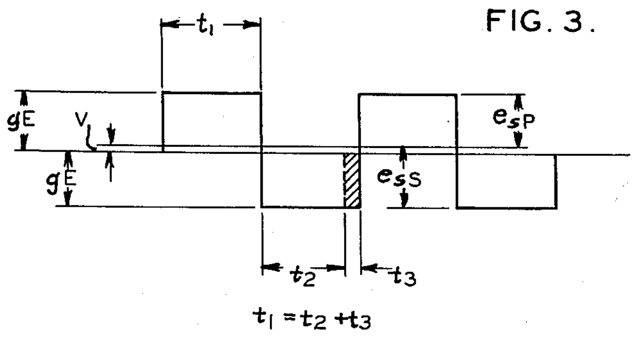
FIG. 3 shows the voltage relationships obtaining in the operation of the circuit of FIG. 1 when the clock voltage in circuit with the secondary winding is a symmetric rectangular wave.

With 0 input, at the start of a primary transition $t_1$ (FIG. 3) when the clock voltage is positive, it is seen that junction point 16 is essentially at ground potential since diode $d_5$ virtually presents a short circuit to ground. Junction point 18 is effectively maintained at the potential of $a$E since diode $d_4$ also presents a minimum resistance and current continually flows from junction point 16 to junction point 18. At this point, it is to be noted that leakage inductance and winding capacity play a relatively significant role but for the purposes of simplification in explanation, they may in general be neglected.

During the primary transition, i.e. when the clock voltage is positive, the current in the secondary circuit decays until point $p$ is reached on the hysteresis loop and then the current source in the primary, consisting essentially of $b$E and $R_p$ forces a current $I_p$ greater than $I_m$ into end 13 of primary winding 12. It is seen that effectively $b$E and $R_p$ provide a source of constant current in the primary loop. This causes current to flow in the secondary winding due to transformer action and the resulting secondary voltage is slightly less than $g$E due to the voltage drops across diodes $d_2$ and $d_1$. The reflected primary voltage is, therefore, slightly less than $gE/n$. This is permissible since $a$E has deliverately been chosen to be greater than $gE/n$.

At the end of a complete primary transition the core state will normally be near point $q$ in FIG. 2. Thus, it is seen that because the constant current primary source forces a secondary current to flow, the primary voltage is controlled by the secondary clock.

With the commencement of the negative portion of the clock voltage, i.e., the secondary transition period, the current flowing from junction point 20, through diode $d_2$ and secondary winding 14 to the clock voltage source $g$E will cause the sense of the core to move from point $q$ (negative saturation). At the start of the secondary transition, $t_2$, (FIG. 3), the core state is normally near $q$ (FIG. 2) and at the finish of $T_2$, it is out line A. The reflected voltage across the primary winding is again approximately $gE/n$. The voltage at junction 20 during both the primary and secondary transitions remains substantially at ground potential.

The circuit equations set forth hereinabove indicate that if $ed_1$ is greater than $ed_2$ by an amount $v$ (FIG. 3), the voltage across the secondary will be slightly greater during secondary transitions than during primary transitions. This condition is desirable and readily achieved by using the same type of diodes for $d_1$ and $d_2$ simply because of the current gain of the amplifier. The voltage difference $v$ forces the circuit to operate so that the diode $d_1$ ceases conducting near the end of the secondary transition in order to equalize the primary and secondary volt seconds. Hence, by this means, the core operating path is forced, at the beginning of each $t_1$ interval to occur from point X.

The utility of this mode of circuit operation may be appreciated by understanding the following specific example. FIG. 2 shows two amplifier core characteristics, core $a$ and core $b$, which may be different due to differences in core areas, saturation flux density, turns, or air core inductance. In spite of the difference, the output signals developed from either of the two normal input signal conditions are essentially the same for each core provided only that the clock voltage is less than $(et)a/t_1$. This is true because in each case, the path of operation is from point X, down past $p$ an amount determined by the clock, not necessarily to point $q$, and back to point X.

Thus, it is seen that with the circuit of FIG. 1, all core transitions are placed under the control of the secondary circuit and the core operating path is forced to occur from beyond the secondary saturation path. With this arrangement, the input-output characteristics of the circuit are no longer critically dependent upon control of the core characteristics such as the type material comprising the core or the number of turns thereon, etc. Neither is there any close control required of voltage in the primary and secondary loops.

Considering the situation where there is an input to junction point 16 which may be −6 volts when $a$E is −6 volts. Let it be assumed that this input is applied at a time coincident with the commencement of the primary transition. In this situation, current will not flow through primary winding 12 and the state of the secondary transition period, the voltage appearing at junction point 20 is substantially $gE+v$.

The invention of FIG. 1 has been so far described utilizing symmetrical clock signals. The advantages of the circuit have been set forth. However, the symmetrical wave is not the preferred form of clock voltage. This may be explained in terms of input output signals.

Figure 5:
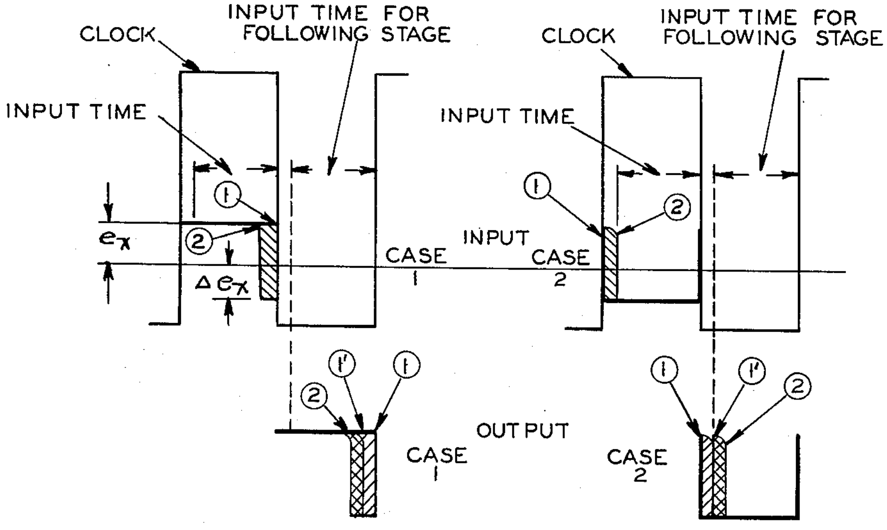
FIG. 5 is utilized to illustrate by way of explanation input-output inconsistency when a symmetric rectangular wave is employed as the clock voltage.

Thus as shown in FIG. 5, ideally there are two states in which a magnetic core will be found at the beginning of an output interval. If it is at point $q$, 0 output volts should exist during the entire output interval. If it is at point $p$ and the core hysteresis loop characteristic is relatively square or rectangular, the full negative voltage should exist during the entire output interval.

For many reasons, ideal conditions do not exist, core characteristics are not square, the windings have leakage inductance and capacity, the diodes are not ideal, the clock voltage and frequency may vary, etc. The ideal outputs are shown as heavy lines in FIG. 5; output, cases 1 and 2. The actual type of outputs obtained are also shown. For case 1, an output "spike" exists; starting at 1' or 2 depending upon the input signal, for case 2, an output "step" exists; terminating at 1' or 2 depending upon the input signal. It may be stated at this point that a spike or full output will always exist at the end of the output time; the primary will accept an input signal only during the time interval noted in FIG. 5 and an input signal will be 0 or greater than $e_x$.

Accordingly, the following sequence of events result. If an ideal input terminating at 1, case 1, is applied, an output spike develops at 1'. The consequence of this signal degradation in a chain of amplifiers is intolerable. Similarly, if an ideal input starting at 1, case 2, is applied, an output step terminating at 1' exists. If this type output is applied as an input, an output step terminating at 2 will develop. This is likewise intolerable.

Figure 6:
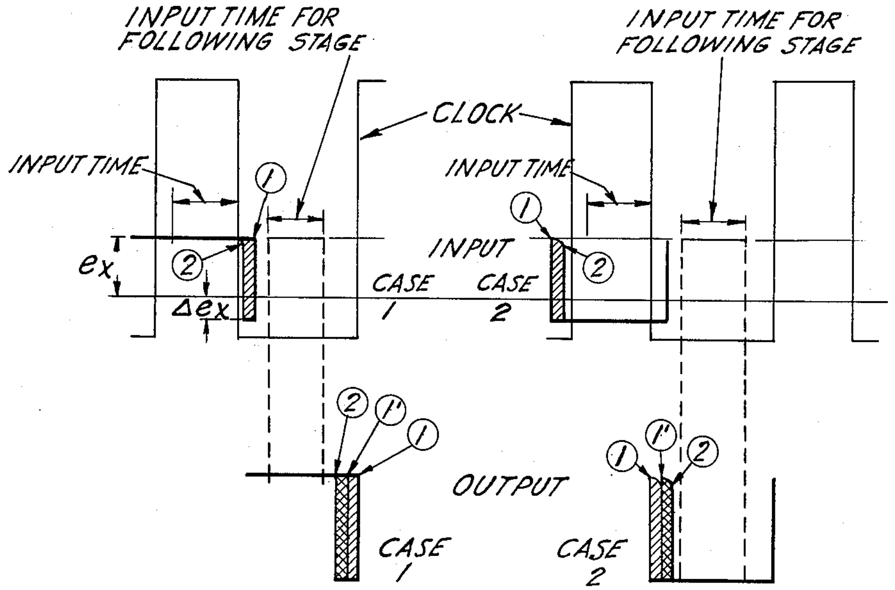
FIG. 6 is utilized by way of explanation to illustrate input-output consistency when an asymmetric rectangular wave is employed as the clock voltage.

In shortcomings of the square wave clock system may be alleviated by employing an asymmetric wave clock system as shown in FIG. 6. The amplifier operation is essentially the same as hereinbefore described with the notable exception that with this scheme, signals exist at the desired level during the entire input time. As long as variations in components, voltage and currents are restricted so that spikes and steps are excluded from the region indicated by the broken lines, acceptable operation is assured.

The circuitry of the device of FIG. 1 and clock system improvements may be described in terms of stability and consistency. Stability may be evaluated by determining how dependent the input-output characteristics are upon components and voltages. Consistency may be evaluated by determining how well the characteristics of the output signal meet the requirements of the input signal.

With respect to input-output stability, it has been shown that the distinguishing operating characteristics of the invention are that all core transitions are placed under control of the secondary circuit and the core operating path is forced to occur from beyond the secondary saturation point (from point X, FIG. 2). This has been accomplished by supplying sufficient primary current and voltage, a suitable arrangement of secondary diode drops, and a suitable secondary clock signal.

Referring back to FIG. 3, it is seen that $e_{sp}$ is the secondary voltage during primary transitions, $e_{ss}$ is secondary voltage during secondary transitions, $v$ is $(ed_1-ed_2)$ and $t_3=(t_1-t_2)$ is spike duration.

The condition for operation is that $ed_1$ is greater than $ed_2$.

The equations for determining spike duration are the following:

$$e_{sp}=gE-v$$
$$e_{ss}=gE+v$$
$$e_{sp}t_1=e_{ss}t_2$$

Thus $$t_1-t_2=t_1 2v/(gE+v)$$

Since $v$ is much smaller than $g$E $$t_3=t_1(2v/gE)$$

The time during which $d_1$ is cut off may be determined from the equation $t_3=t_1(2v/gE)$. The output during this time (the spike) is determined when driving additional amplifiers. On the other hand, the existence of this spike is desirable in that it serves to provide a uniform starting condition for all primary cycles regardless of whether the primary is to provide a core transition or not. Thus, this uniform starting condition is desirable because it uniquely defines the time before which the input signal must arrive.

At the start of the output time, a delay (the step) exists in cutting off diode $d_1$. The uniformity of this delay is augmented by the spike.

Accordingly, it is seen that although the input-output characteristics of the invention are not critically dependent upon components or voltages and hence is stable, when a symmetrical wave is utilized as the clock, a shortcoming exists because the output signal (the spike and the step) is not consistent with input signal requirements. This condition would lead to rapid signal degradation in a series chain of amplifiers and hence has to be eliminated. Such elimination may be accomplished without loss of stability by suitably modifying the shape of the clock signal.

Figure 4:
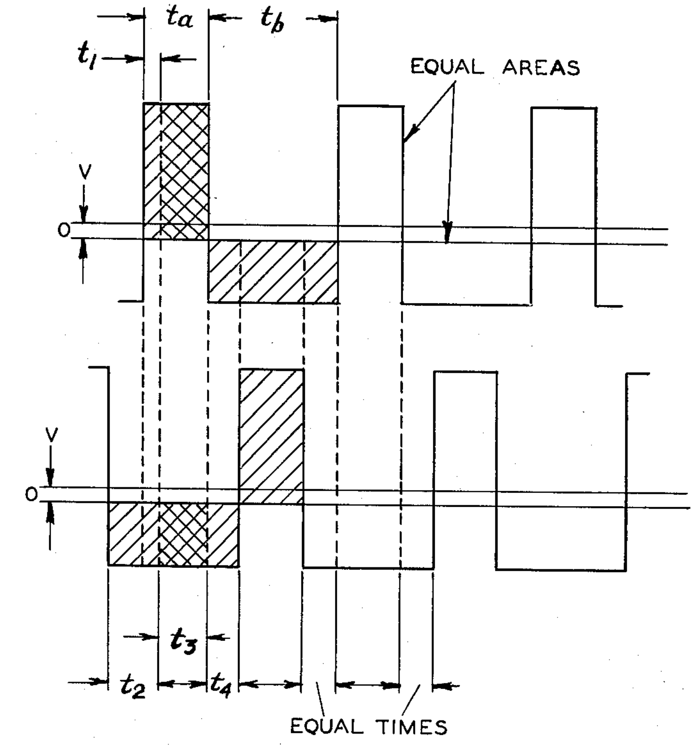
FIG. 4 is a depiction of a preferred shape and time relationship of clock signals of successive amplifier stages.

Consistency of input and output is attained by utilizing the clock signal shown in FIG. 4. The significant points to be noted are the difference in widths but equality of areas above and below the reference line and the symmetrical relationship between the two phases.

The clock signal shown in FIG. 4, phase A may be applied to the circuit shown in FIG. 1 without loss of stability because of the equality of the shaded areas. The output of this circuit may in turn be used as the signal source for a similar circuit driven by clock phase B, etc.

The symmetrical arrangement of phases A and B of the clock signal shown in FIG. 4 results in consistency of output and input because it permits restricted spikes and steps to exist at a time when they cannot influence the core state. This may be readily understood by explaining the circuit operation.

Time $t_a$ (FIG. 4) is the primary transition time, and time $t_b$ is the secondary transition or output time. Because of the time necessary for the decay of the secondary current, the primary cannot accept input signals until after $t_1$, but can accept input signals during $t_a-t_1$ (double cross hatch in FIG. 4). This will be the condition at the start of every $t_a$ interval because at the end of every $t_b$ interval, full load secondary current will exist. During time $t_b$, the secondary circuit dominates, and by transformer action may determine the primary voltage; due to the diode input coupling, this is acceptable.

Thus, it may be seen that $t_3$ is the only time interval during which an output signal can be effective in driving a succeeding stage. Therefore, as long as steps are less than $t_2$ and spikes are less than $t_4$, they can do no harm.

The amplifier gain is influenced by the ratio $t_b/t_a$; this ratio may be chosen on the basis of controllable component characteristics and the desired voltage tolerances.

The mode of circuit operation is not restricted to the circuit shown in FIG. 1. It may be applied to circuits incorporating dual polarity output windings and inhibit inputs applied at the point of application of negative potential $a$E. Vacuum tube circuits and magnetic heads may be driven by the circuit and vice versa.

Figures 7, 8:
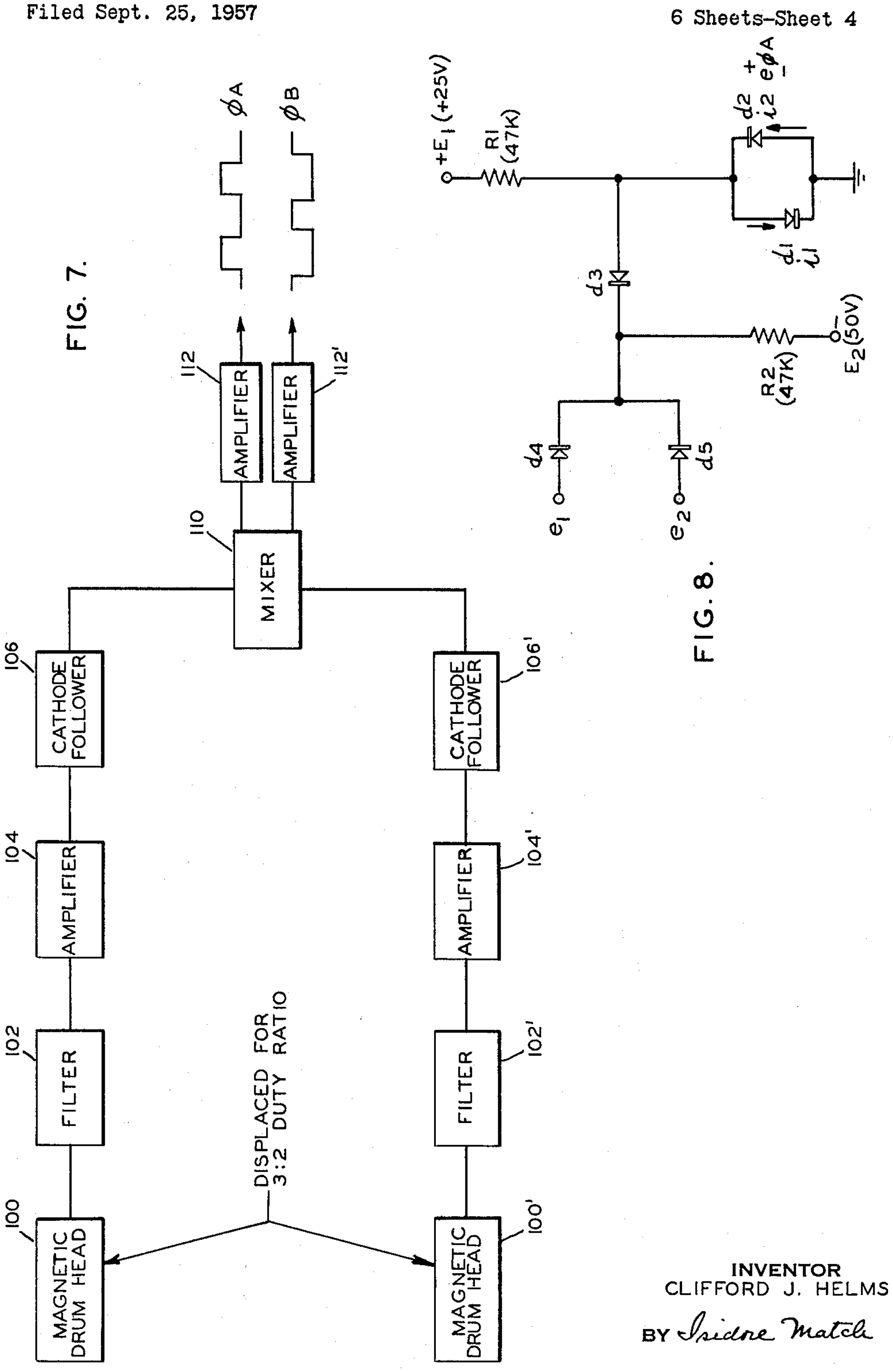
FIG. 7 is a block diagram of a novel circuit for producing two trains of like asymmetric rectangular waves displaced 180° in phase with respect to each other.
FIG. 8 is a schematic diagram of the mixer of FIG. 7.

The novel clock signal generator depicted in block form in FIG. 7 is characterized by the following properties. It provides a 180 degree phase difference between two non-symmetrical phases, each of which is available in both polarities; relatively independent of repetitive rate. It has steady duty ratio (3:2 for example); relatively independent of repetition rate. It has a repetitive rate of about 10 kc. It is characterized by freedom from jitter (transitions within ±2% of period from jitter free location). It has rise times of about 1/50 of the pulse width. The amplitude of the pulse is constant to within ±10%; a suitable voltage being from 10 to 15 volts and a suitable current being from 2 to 3 amperes down to 0 amperes. It has a low source impedance which is essentially resistive and less than 0.2 ohms.

Figure 10:
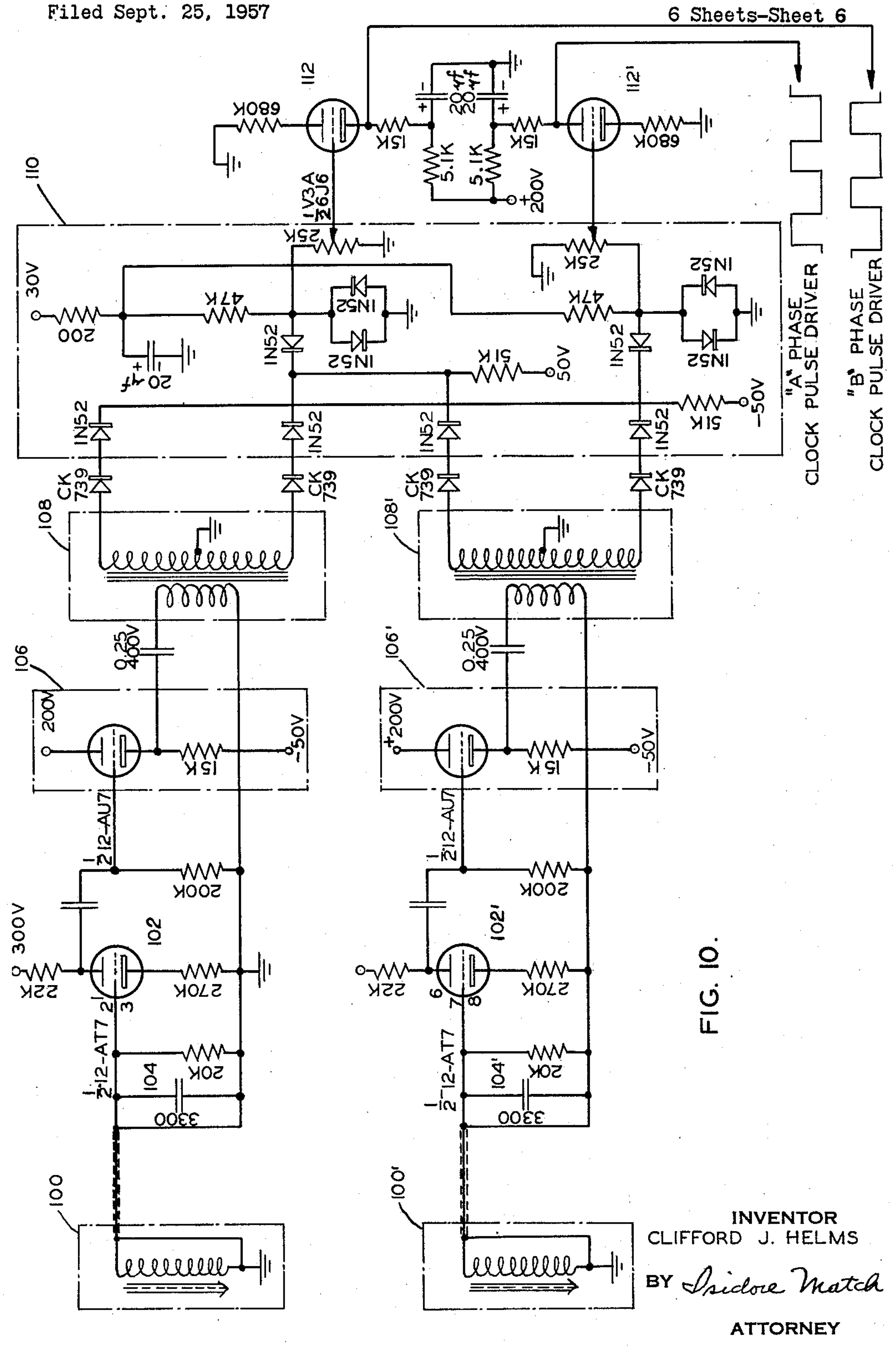
FIG. 10 is a schematic diagram of the circuit shown in block form in FIG. 7.

Referring now to FIG. 7, two magnetic drumheads 100 and 100' respectively derive relatively high amplitude signals from a recorded timing track (not shown). The drum heads are displaced in time about 1/10 of a period (36°). The regular periodic signals from the head are filtered through respective filters 102 and 102' to remove high frequency components which would otherwise cause jitter. The outputs from respective filters 102 and 102' are essentially sine waves with about 10% amplitude modulation caused by drum eccentricity. These respective signals are amplified in amplifiers 104 and 104'. Cathode followers 106 and 106' make the signals available at a low impedance level. The cathode followers drive respective low leakage inductance transformers 108 and 108' (FIG. 10) each transformer providing two signals 180° out of phase. Thus four signals, two from each channel are provided to drive the mixer. In the mixer, the relatively high level sine wave signals are clipped and converted into relatively low level rectangular signals possessing the proper phase relationship and duty ratio. These signals are in turn applied to amplifiers 112 and 112' which possess a high degree of feedback and which are used to drive the series magnetic amplifier stages.

Mixer 110 is shown in schematic detail in FIG. 8. The circuit shown in this figure is an "or" element with a two way clamped output. It is seen that diode $d_3$ will be nonconducting when and only when either diodes $d_4$ and $d_5$ are conducting. By appropriate choice of the constant current source levels, diode $d_1$ will be conducting only when diode $d_3$ is not. Only when diode $d_3$ is conducting will diode $d_2$ be conducting. In connection with the circuit of FIG. 8, the following equations obtain $$I_{d1}=I_{d2} \qquad \frac{E_1}{R_1}=I_{d1}$$

$$I_{d1}+I_{d2}=\frac{E_2}{R_2} \qquad 2\frac{E_1}{R_1}=\frac{E_2}{R_2}$$

Figure 9:
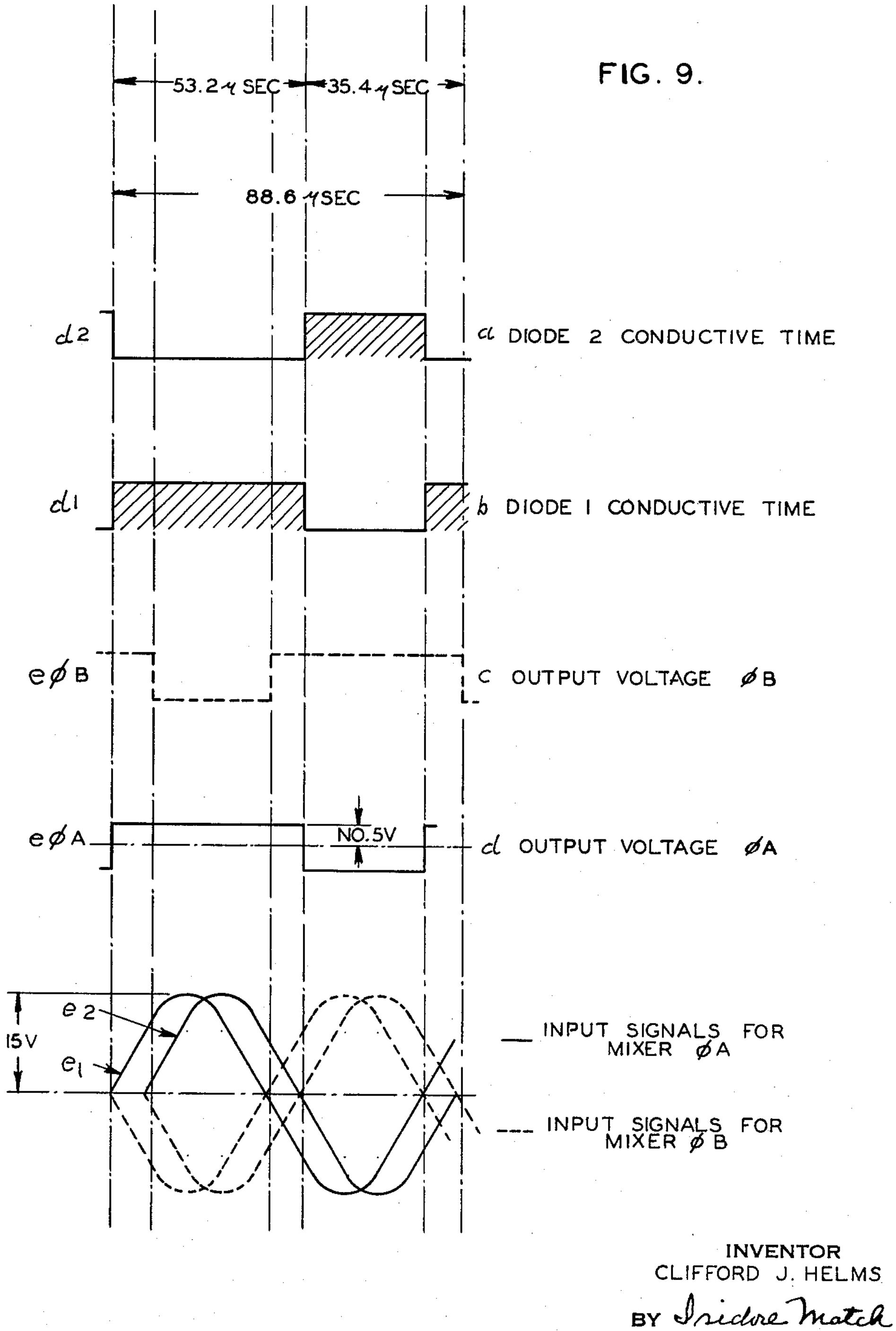
FIG. 9 is a timing diagram of the mixer wave forms.

With sufficiently large and properly phased drive signals, mixer 110 will deliver fast rise, uniform amplitude signals. This may be readily understood by referring to FIG. 9. It is seen that the 15 volt sine signals pass through the .5 volt region very rapidly and the diodes effectively clamp the output voltage an equal amount either side of ground. The wave shape and amplitude of the drive signals have little effect on the output signal; the main requirement is that they cross the ground level at a rapid rate, and be free of frequency variations.

The significant points to be noted about the circuit of FIG. 7 is that the head displacement fixes the phase difference, and hence the duty ratio, independent of drum speed. The mixing circuit establishes the phase relationship between phase A and phase B signals independent of drum speed. The large amplitude of the mixer drive signals assures rapid rise and fall times. The mixing circuit clamp diodes fix the amplitude of the feedback amplifier input signal. It is of course understood that the output waveforms of amplifiers 112 and 112' assume the shape of that in FIG. 4 in a very short time so that the volt seconds of the positive and negative going portions are equalized.

Figure 11:
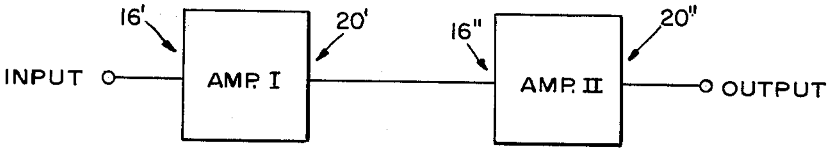
FIG. 11 is a block diagram of a pair of amplifiers of the type shown in FIGURE 1 connected in cascade.

FIGURE 11 is a block diagram showing two amplifiers of the type shown in FIGURE 1 connected in cascade, i.e., output point 20' of the amplifier identified by Roman numeral I, connected to input point 16'' of the amplifier identified by Roman numeral II. The individual elements of each of these two amplifiers are the same as those shown in FIGURE 1. It is believed that discussion of this arrangement is not required.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A magnetic amplifier comprising a core consisting of a magnetic material, primary and secondary windings on said core, a source of positive potential, first and second unilateral conducting means, means for applying said positive potential to one end of each of said windings through said first and second unilateral conducting means respectively, said unilateral conducting means being connected to a reference potential, a rectangular wave voltage source in circuit with the other end of said secondary winding, a first negative potential source connected to the other end of said primary winding, a second negative potential source, third unilateral conducting means connected between said second negative potential source and said other end of said primary winding, the ratio of turns of said secondary to primary winding, and the values of said rectangular wave voltage and said negative potential source being so chosen that a voltage reflected from said secondary to said primary winding is sufficient to render said third unilateral conducting means non-conductive.

2. An amplifier comprising a core consisting of a magnetic material, primary and secondary windings on said core, first and second unilateral conducting means, a source of positive potential, means for applying potential from said source to one end of each of said windings through said first and second unilateral conducting means respectively, each of said unilateral conducting means being poled in the forward direction of current flow with respect to said positive potential source, said unilateral conducting means being connected to a source of reference potential, a rectangular wave voltage source in circuit with the other end of said secondary winding, a source of negative potential, third unilateral conducting means, means for connecting said negative potential source to the other end of said primary winding through said third unilateral conducting means, said last named means being poled in the forward direction of current flow with respect to said negative potential source, the value of said negative potential being chosen to be greater than the quotient of said rectangular wave voltage and the secondary to primary winding turns ratio.

3. An amplifier comprising a core consisting of a magnetic material characterized by a relatively rectangular hysteresis loop, primary and secondary windings on said core, first and second unilateral conducting means, a source of positive potential, means for applying voltage from said source to one end of each of said windings through said first and second unilateral conducting means respectively, each of said unilateral conducting means being poled in the forward direction of current flow with respect to said potential source, a rectangular wave voltage source in circuit with the other end of said secondary winding, a first negative potential source, a second negative potential source, means for coupling the other end of said primary winding to said first negative potential source, third unilateral conducting means connected between said second negative potential source and the other end of said primary winding, said third unilateral conducting means being poled in the forward direction of current flow with respect to said negative potential source, the value of said second negative potential being so chosen that it is greater than said rectangular voltage divided by the secondary to primary turns, ratio, fourth unilateral conducting means connected between said first unilateral conducting means and a source of reference potential, means connecting said positive potential to said fourth unilateral conducting means, said fourth unilateral conducting means being poled in the forward direction of current flow with respect to said positive potential source, fifth unilateral conducting means connected between said second unilateral conducting means and said reference potential, and means connecting said positive potential to said fifth unilateral conducting means, said fifth unilateral conducting means being poled in the forward direction of current flow with respect to said positive potential source.

4. A magnetic amplifier comprising a magnetic core, primary and secondary windings thereon, a clock voltage source in circuit with said secondary winding, said clock voltage source providing a rectangular wave having positive and negative portions, one of said portions having the greater width, the other of said portions having the greater amplitude, the area of each of said portions being substantially equal, and means for providing a substantially constant current in said primary winding to cause transformer action in said core whereby the voltage reflected to said primary winding is substantially consistently the product of said clock voltage and said primary to said secondary winding turns ratio.

5. A magnetic amplifier as defined in claim 1 wherein said rectangular wave voltage source supplies a train of asymmetric rectangular waves, each of said waves having a first portion having a greater width, and a second portion having a greater amplitude, the area enclosed by each of said portions being substantially equal.

6. An amplifier as defined in claim 2 wherein said rectangular wave voltage source supplies a train of asymmetric rectangular waves, each of said waves having a first portion having a greater width and a second portion having a greater amplitude, the area enclosed by each of said portions being substantially equal.

7. An amplifier as defined in claim 3 wherein said rectangular wave voltage source supplies a train of asymmetric rectangular waves, each of said waves having a first portion having a greater width and a second portion having a greater amplitude, the area enclosed by each of said portions being substantially equal.

8. A cascaded arrangement of magnetic amplifiers, each of said amplifiers comprising a magnetic core, primary and secondary windings on said core, a clock voltage source in circuit with the secondary winding said clock voltage source comprising means for providing a train of asymmetric rectangular waves, each of said waves having a first portion having a greater width and a second portion having a greater amplitude, the area enclosed by each of said portions being substantially equal, and means for providing a substantially constant current in the primary winding to cause transformer action in the core whereby the voltage reflected from the secondary to the primary winding is substantially the quotient of the clock voltage divided by the ratio of secondary to primary winding turns, the respective clock voltage sources in successive amplifiers in said arrangement being substantially 180° out of phase with each other.

9. An arrangement as defined in claim 8 wherein said cores consist of a magnetic material characterized by a relatively rectangular hysteresis loop.

References Cited in the file of this patent

UNITED STATES PATENTS

| | | |
|---|---|---|
| 2,727,999 | Rusler | Dec. 20, 1955 |
| 2,753,466 | Swift | July 3, 1956 |
| 2,792,506 | Torrey | May 14, 1957 |
| 2,801,345 | Eckert | July 30, 1957 |
| 2,854,586 | Eckert | Sept. 30, 1958 |
| 2,825,820 | Sims | Mar. 4, 1958 |
| 2,901,636 | Torrey et al. | Aug. 25, 1959 |
| 2,907,893 | Eckert | Oct. 6, 1959 |